Patented June 27, 1950

2,513,241

UNITED STATES PATENT OFFICE 2,513,241

NONEMITTING ELECTRODE FOR ELECTRIC DISCHARGE TUBES

Gilles Holst and Hendrik Johannes Merrkamp van Embden, Eindhoven, Netherlands, assignors to Hartford National Bank and Trust Company, Hartford, Conn., as trustee No Drawing. Application July 16, 1946, Serial No. 684,002. In the Netherlands March 10, 1943

Section 1, Public Law 690, August 8, 1946
Patent expires March 10, 1963

3 Claims. (Cl. 250—27.5)

The invention relates to electric discharge tubes or incandescent lamps and more particularly to the composition of electrodes and other components of such a tube or lamp; the invention furthermore relates to a method of manufacturing these electrodes.

In connection with the fact that electrodes and other components of these tubes or lamps have to fulfill various conditions, only special materials may be utilized for the construction thereof. In technics use is therefore always made of the same metals and chiefly of nickel, molybdenum, graphite and also of nickel-plated iron. Although out of economical considerations it would be preferable to utilize iron or known alloys of iron, one was obliged to proceed to the use of iron only if it is coated with a protective layer of nickel, for uncoated iron oxidizes too rapidly and, moreover, at the temperatures to which it is heated in the interior of electric discharge tubes and incandescent lamps, it evolves such large quantities of gas that it cannot be utilized in these tubes and lamps whilst, in addition, it entails other drawbacks such as deformation when heated.

Also the known iron alloys such as chromium steel, manganese steel or nickel steel are for different reasons not suitable for universal use.

Experiments which led to the present invention, have shown that particular iron alloys do not give rise to the previously mentioned drawbacks. An electric discharge tube or incandescent lamp according to the invention comprises to that end one or more electrodes or other components, which are built up from an alloy of iron with a low percentage of titanium and/or aluminum. Whenever here reference is made to iron, this term has to be understood to mean the ordinarily utilized iron which contains a percentage up to approximately 1% of impurities such as manganese, silicon and carbon.

On account of the above-mentioned investigations it is not deemed excluded that the difficulties which stand in the way of the use of iron are essentially due to two causes. Firstly, as has been set out hereinbefore, large quantities of gas are set free from iron or iron alloys, due to which the vacuum is deteriorated very rapidly; secondly, trouble is experienced from the point of transformation from the $\alpha$ modification into the $\gamma$ modification. Whenever at an increase or decrease of the temperature the material passes this transformation point, there are set up stresses which are manifested by deformations which are, of course, undesirable for the components of electric discharge tubes or incandescent lamps with which frequently very small spacings must be exactly and permanently maintained.

By alloying the iron with a low percentage of titanium and/or aluminum, these drawbacks are avoided since, on the one hand, no gas or very slight quantities of gas are set free and, on the other hand, the said transformation point is completely suppressed, that is to say that this point disappears and that over the whole of the temperature range which is concerned here, the iron retains the same modification.

As has been set out hereinbefore, the admixtures are small, i. e. not larger than 7%, such in connection with the fact that with higher percentages of these alloy-constituents the iron becomes no longer sufficiently workable. On the ground of the latter fact also the use of titanium is to be preferred over the use of aluminum since aluminum has a more harmful effect on the workability of the iron than titanium. Appreciable advantages may be obtained with an alloy of iron and titanium which contains from 1 to 4% by weight of titanium.

It may be observed that in this case the use of metallic titanium is concerned and not the use of the combination known in itself of iron and titanium carbide. For this purpose it is desirable that the iron should be substantially free from carbon, that is to say that it should contain less than 0.15% of carbon. It is possible to replace aluminum and titanium partly by one or more other constituents, vid. vanadium, zirconium, chromium, tungsten, molybdenum or silicon. In this case the total amount of the alloy constituents must not exceed 7% whilst it is not advisable that less than half of the alloy-constituents consists of titanium and/or aluminum.

The use of an alloy of iron and titanium offers a further very important advantage, which resides in that the components made of this material can be easily blackened, i. e. be provided with a black layer, in order to promote the radiation of heat or to reduce the secondary emission, for the use of iron still entailed the drawback that iron components cannot be blackened or can be blackened only with difficulty, in contrast to nickel components which can be provided very easily with a black layer by superficial carbonization. According to one particular method, a body consisting of an alloy of iron and titanium may be blackened, in accordance with the present invention, by heating it for a short time in an atmosphere which contains a small quantity of oxygen, and more particularly in a slightly reducing atmosphere, owing to which the outer surface of the object is coated with a black film of titanium. A very intense blackening may also be obtained by superficially carbonizing the alloy in the manner usually employed for nickel, that is to say by heating it in an atmosphere of hydro-carbons.

An electrode of an electric discharge tube or incandescent lamp may be obtained in a simple manner by adding a small quantity of titanium to a quantity of iron and by melting the total amount thereof, whereupon in a manner known in itself objects, for example grid wires, anodes, supports, grid rods, bulbs for metal tubes, etc. may be manufactured therefrom. It is also possible to utilize instead of titanium the commercial ferro-titanium obtained by the Goldschmidt process.

What we claim is:

1. An electric discharge tube comprising a non-emitting electrode built up from iron which contains titanium in an amount greater than 0% and less than 7% by weight.

2. An electric discharge tube comprising a non-emitting electrode built up from iron which contains from 1% to 4% of titanium by weight.

3. An electric discharge tube comprising a non-emitting electrode built up from iron which contains titanium and an element selected from the group consisting of chromium, tungsten and molybdenum in an amount greater than 0% and less than 7% by weight.

GILLES HOLST.
HENDRIK JOHANNES MERRKAMP
van EMBDEN.

REFERENCES CITED

The following references are of record in the file of this patent:

UNITED STATES PATENTS

| Number | Name | Date |
| --- | --- | --- |
| 1,600,595 | Lebrun | Sept. 21, 1926 |
| 1,757,976 | Rentschler | May 13, 1930 |
| 1,787,977 | Fahrenwald | Jan. 6, 1931 |
| 2,140,367 | Lowry | Dec. 13, 1938 |
| 2,369,146 | Kingston | Feb. 13, 1945 |

FOREIGN PATENTS

| Number | Country | Date |
| --- | --- | --- |
| 305,521 | Germany | Sept. 17, 1919 |
| 331,414 | Germany | Jan. 4, 1921 |